United States Patent Office 3,522,228
Patented July 28, 1970

3,522,228
NOVEL METHOD FOR POLYMERIZING A VINYL COMPOUND IN THE PRESENCE OF A CARBON DIOXIDE MEDIUM
Kenichi Fukui and Tsutomu Kagiya, Kyoto, Hisao Yokota, Kobe, Yahiko Toriuchi, Toyonaka-shi, and Kuniyoshi Fujii, Suita-shi, Japan, assignors to Sumitomo Chemical Company, Ltd., and Sumitomo Atomic Energy Industries, Ltd., both of Osaka, Japan, both corporations of Japan
No Drawing. Filed May 15, 1967, Ser. No. 638,565
Claims priority, application Japan, May 19, 1966, 41/32,247
Int. Cl. C08d 1/00; C08f 1/16
U.S. Cl. 260—94.9         6 Claims

ABSTRACT OF THE DISCLOSURE

Method for polymerizing vinyl monomer compounds in the presence of a catalyst comprising conducting polymerization in liquid carbon dioxide at a temperature of −78° to 100° C. and under super atmospheric pressure.

---

This invention relates to a method for preparing a polymer, where one or more kinds of monomers belonging to a vinyl compound polymerizes singly or copolymerizes under the action of a catalyst which is characterized by conducting the polymerization or copolymerization reaction in liquid carbon dioxide.

Polymers obtained by polymerizing a vinyl compound, for example, vinyl chloride, acrylonitrile, and methyl acrylate, by catalytic action have been heretofore utilized in various applications as plastics, fibers, or the like, and are now an indispensible raw material for the industry. These polymers are usually prepared by polymerizing monomers in a dispersant such as water or organic solvent by an action of a catalyst, and thus the processes for separating the resulting polymer from the dispersant, washing, and further drying are indispensable.

For example, polymerization of vinyl chloride according to the conventional method is carried out as follows: vinyl chloride is dispersed or emulsified in water serving as a dispersant, and the polymerization is carried out using peroxide as a catalyst. However, a large capacity equipment is inevitably necessary for the post-treatment processes for washing and drying the polymer. Further, the emulsifying agent used inevitably remains in the resultant polymer, and is often a cause for deterioration of the quality of the product. To avoid said disadvantages, a special method, for example, a bulk polymerization process has been proposed and carried out on an industrial scale (U.S. Pat. 2,715,117 and Chem. Eng., Dec. 20, 1965, page 74). However, such method has required a special type reactor such as a horizontal, rotating ball mill-type reactor and a complicated machinery.

The present invention is based on a discovery that, when one or more kinds of monomers belonging to a vinyl compound is polymerized singly or copolymerized under catalytic action, carbon dioxide can serve as a very useful solvent or dispersant in the polymerization, or copolymerization reaction. That is to say, it was found out that, when vinyl chloride, acrylonitrile, or other vinyl compound polymerizes under the action of catalysts in liquid carbon dioxide, the carbon dioxide used as a diluent never impedes the polymerization or copolymerization reaction. Further, when carbon dioxide is used as a diluent in such a way, a number of advantages have been found as described below.

The present invention provides a process for producing a homopolymer or a copolymer of at least one monomer vinyl monomer compound by the action of a catalyst, which comprises conducting polymerization in liquid and/or solution of carbon dioxide at a temperature of −78° to 100° C. under a pressure higher than the atmospheric pressure.

Carbon dioxide is very cheap, as compared with organic solvent, and can be readily separated and recovered as a gas by reducing the pressure of the system to the atmospheric pressure, after completion of the reaction or after the polymer mixture has been left from the polymerization zone in case of the continuous polymerization reaction. Further, the resulting polymer generally is not dissolved in liquid carbon dioxide, and thus the formed polymer can be obtained as powders in most cases.

Furthermore, any absorption band of carbonyl group, which is originated from carbon dioxide is not observed at all in the infrared absorption spectrum of the thus obtained polymer. This fact means that carbon dioxide is effective only as a dispersant, and does not evidently react as a comonomer in the polymerization.

Polymerization of vinyl chloride is one of examples where the present invention is most advantageously applicable. According to the present invention, vinyl chloride polymer can be very simply produced, though a slightly higher reaction pressure is employed than the conventional one. That is to say, when vinyl chloride polymerizes in liquid and/or solution of carbon dioxide, powdery polymer can be obtained only by reducing the pressure of the polymerization vessel to the atmospheric pressure, after the completion of reaction, to recover unreacted monomer and carbon dioxide. The resulting powdery polymer may be used as a product as it is, without any further after-treatment such as washing and drying, depending upon the use of the product. The foregoing polymerization reaction of vinyl chloride is an example only for illustrating the utility of the present invention, and the similar advantages can be recognized in a number of single polymerizations or copolymerizations of vinyl compounds.

As a vinyl compound used in the present invention, ethylene halide; styrene and its substituted compounds; vinyl monomer containing other aromatic ring, or heterocyclic ring; acrylic acid, vinyl acetate and their derivatives; methacrylic acid, and their esters; vinylester; and compounds containing vinyl group, such as vinylether are generally mentioned.

As concrete examples of the vinyl compounds as shown above by general names, vinyl chloride, tetrafluoroethylene, vinyl fluoride, vinylidene chloride, dichloroethylene, styrene, methylstyrene, dimethylstyrene, ethylstyrene, vinylstyrene, chlorostyrene, indene, vinylnaphthalene, vinylfuran, acrylic acid, acryl chloride, acrylonitrile, acryl amide, methacrylic acid, methacrylonitrile, methyl acrylate, ethyl acrylate, vinyl acrylate, allyl acrylate, methyl methacrylate, ethyl methacrylate, vinyl methacrylate, allyl methacrylate, benzyl methacrylate, vinyl acetate, vinyl chloroacetate, vinyl stearate, ethylvinylether, etc. are mentioned. The foregoing compounds are mentioned as examples, and other vinyl compounds than the foregoing can be used in the present invention.

Carbon dioxide used in the present invention is, generally, required to have a purity above 99.0 vol. percent, but carbon dioxide in a cylinder available in market can be used as it is. Concentration range of carbon dioxide is from one-fourth to 20 times the wight of monomer used, but particularly preferable one to four times the weight of the monomer.

Ordinarily, a radical polymerization initiator can be used as a catalyst. As radical polymerization initiator, ordinary radical initiator is used; for example, diaroyl peroxide, dialkyl peroxide, alkyl hydro-peroxide, alkyl peroxycarbamate, azobisinitrile, azobis-substituted alkane, cyclic azobisinitrile, diazoaminobenzene, etc., are mentioned. Further, such organic peroxides as benzoyl peroxide, lauroyl peroxide, acetyl peroxide, ketone peroxide, diisopropyl peroxydicarbonate cumene hydroperoxide, t-butyl hydroperoxide, di-t-butyl peroxide, etc.; such azobisnitrile as 2,2′-azobisisobutyronitrile, 2,2′-azobispropionitrile, etc.; such azo and diazo compounds as diazoaminobenzene, nitrosoacyl arylamines, azothioethers, p-nitrobenzene diazoniums; N-nitrosoacyl anilide; tetraphenylsuccinonitrile; nirtosophenyl urea, etc. can be mentioned. It is generally hard to polymerize vinylethers by an action of said radical polymerization initiator, but in such case, a halide of Friedel-Crafts type catalyst such as titanium tetrachloride, or a complex compound of boron fluoride etherate, etc., can be used as a polymerization initiator. Further, in some case, a single organoaluminum compound such as triethylaluminum, or a coordination catalyst consisting of said organoaluminum compound and titanium chloride such as titanium tetrachloride, can be used as a catalyst.

These catalysts can be added singly to the polymerization system, but sometimes it is convenient to use the catalyst in the solution form. In such case, an organic solvent such as hydrocarbons and ethers, is used, but it is particularly effective from the principle of the present invention to use a low boiling point organic compound, because the solvent used is never retained in the separated polymer. As a low boiling point solvent, propane, butane, pentane, dimethyl ether, etc. are used.

In carrying out the present invention, a temperature in a range of −78° to 100° C. can be used.

Further, the polymerization is generally conducted under pressure. Pressure depends upon kind and concentration of monomer used, and polymerization temperature, but sometimes reaches several ten to several hundred atmospheric pressures.

Concrete explanation of the present invention is made hereunder with reference to examples, but these examples are not to restrict the scope of the present invention. All of these examples are carried out in an autoclave batchwise, but the present invention can be carried out continuously, as explained below: monomer and carbon dioxides are continuously charged into an autoclave or a cylindrical or tubular pressure reaction vessel under pressure at definite ratios separately or in a mixture. On the other hand, a catalyst is mixed in advance into carbon dioxide so as to keep a definite concentration, or charged into the pressure reaction vessel separately. Or, instead of the catalyst, an ionizing irradiation can be utilized. The mixture thus obtained is retained in the pressure reaction vessel for a definite period of time, and then the resulting polymer is continuously withdrawn from the pressure reaction vessel together with carbon dioxide and unrecated monomer. Polymer is separated, and on the other hand carbon dioxide and unrecated monomer are recycled to the pressure reaction vessel, whereby a polymer is continuously prepared.

In the following examples monomers, which are in a liquid state at the ordinary temperature, were purified by distillation or by reduced pressure distillation, and used, but the monomers, which are in a gaseous state at the ordinary temperature, were directly charged from the gas cylinder available in market. Market-available carbon dioxide was used as it was.

EXAMPLE 1

39 g. of vinyl chloride and 44 g. of carbon dioxide were directly charged from the market-available gas cylinders respectively into a stainless steel autoclave having an inner capacity of 150 ml., the autoclave having been cooled in advance with a liquid nitrogen. The respective charged amounts were determined by weighing the weights. After the temperature has been elevated to room temperature, the content was stirred by a magnetic induction stirrer, and γ-ray from Co–60 was irradiated. The strength of γ-ray was $2 \times 10^5$ roentogens per hour.

After 20 hour irradation, unrecated monomer and carbon dioxide were discharged by reducing the inner pressure to the atmospheric pressure. Powdery polymer partly containing small lumps remained in the autoclave, and the weight of said polymer was 38 g. Small lumps of the polymer were able to be readily pulverized by pressing. Average molecular weight of the resulting polymer was 23,600 by means of the viscosity study.

EXAMPLE 2

0.4 ml. of a toluene soltuion (50% by weight) of diisopropyl peroxydicarbonate was charged in advance into a stainless steel autoclave having an inner capacity of 30 ml., and an autoclave was tightly closed, and exhausted by a vacuum pump while cooling the autoclave with a liquid nitrogen. Then, 7.1 g. of vinyl chloride and 5.0 g. of carbon dioxide were charged therein. The autoclave was dipped in water bath at 20° C. and retained therein for 15 hours, and then unrecated vinyl chloride and carbon dioxide were discharged. It was observed that 1.06 g. of white powdery polymer remained in the autoclave. Average molecular weight of the resulting polymer was 36,300 by means of the viscosity study.

EXAMPLE 3

0.2 ml. of a benzene solution (concentration 0.205 g./5 ml.) of 2,2′-azobisisobutyronitrile was used as a catalyst, and 5.2 g. of styrene and 4.4 g. of carbon dioxide were used. The same procedure as in Example 2 was employed, except that the polymerization temperature was kept at 50° C. and the reaction was continued for 20 hours. A transparent viscous liquid remained in the autoclave. When methanol was added to said liquid, a white precipitate was obtained. After washing and drying, 1.2 g. of polystyrene was obtained. The molecular weight of the resulting polymer was 12,000.

EXAMPLE 4

Polymerization was conducted in the same manner as in Example 3, except that 2.6 g. of styrene, 2.5 g. of methyl methacrylate, and 4.4 g. of carbon dioxide were used. The resulting polymer was a viscous liquid, and a precipitate was obtained using methanol. After washing and drying, 1.8 g. of white powdery polymer was obtained. Infra-red absorption spectrum determination of said polymer revealed that a copolymer of about 1:1 was formed. That is to say, it was observed that there were absorption bands ascribable to styrene at 696, 755, 840, and 1,460 cm.$^{-1}$, and absorption bands ascribable to methyl methacrylate at 985, 1,195, and 1,725 cm.$^{-1}$. When said polymer was heated, it started to slowly decompose at 150° C., but was not melted up to 200° C.

In place of the catalyst, the polymerization was conducted at approximately same conditions as above, except that γ-ray was irradiated from Co−60 at a dosage of $1 \times 10^5$ roentogens per hour at room temperature for 20 hours, and as a result 0.41 g. of polymer was obtained. Infra-red spectrum determination revealed that the resulting polymer is similar to that obtained when the catalyst was used.

EXAMPLE 5

Polymerization was conducted in the same manner as in Example 2, except that 2.7 g. of acrylonitrile and 5.0 g. of carbon dioxide were used, and γ-ray was irradiated at a dosage of $1 \times 10^5$ roentogens per hour at room temperature for 20 hours, and 2.3 g. of white solid polymer was obtained. Average molecular weight of the resulting polymer was 370,000.

EXAMPLE 6

7.5 g. of white solid polymer was obtained in the same manner as in Example 5, except that 7.5 g. of acrylic acid and 3.5 g. of carbon dioxide were used. Average molecular weight of the resulting polymer was 480,000.

EXAMPLE 7

Polymerization was conducted in the same manner as in Example 5, except that 2.9 g. of vinyl chloride, 4.3 g. of vinyl acetate, and 4.5 g. of carbon dioxide were used. Though a viscous liquid remained in an autoclave, a precipitate was obtained therefrom with methanol. After washing and drying, 6.0 g. of white powdery polymer was obtained. Infra-red absorption spectrum of said polymer showed characteristic bands at 720 cm.$^{-1}$ and 1,725 cm.$^{-1}$ ascribable to vinyl chloride and vinyl acetate respectively, and as a result the thus obtained polymer was found to be a copolymer. Said copolymer was completely melted between 136° and 142° C.

EXAMPLE 8

Polymerization was conducted in the same manner as in Example 3 except that 4.3 g. of vinyl acetate and 4.4 g. of carbon dioxide were used and 0.2 ml. of a n-butane solution (concentration: 0.23 g./5 ml.) of 2,2′-azobisisobutyronitrile was used as a catalyst. After carbon dioxide was discharged, the resulting polymer was dissolved in acetone together with unreacted monomer, and reprecipitated with water. As a result, 3.4 g. of small lumps of soft solid polymer were obtained.

Average molecular weight of the polymer was $1.6 \times 10^6$ according to the viscosity method.

In place of the catalyst, γ-ray irradiation was conducted, whereby an approximately similar polymer was obtained.

EXAMPLE 9

Polymerization was carried out in the same manner as in Example 2 except that 7.2 g. of ethyl vinyl ether and 4.4 g. of carbon dioxide were used and reaction was conducted at room temperature for 20 hours using 0.059 ml. of tin tetrachloride as a catalyst. As a result, 4.1 g. of viscous liquid polymer was obtained.

In place of tin tetrachloride, 0.064 ml. of ethyl etherate of boron trifluoride was used, whereby approximately the same result was obtained. Addition of those catalysts was all conducted in a nitrogen atmosphere.

EXAMPLE 10

Polymerization was carried out in the same manner as in Example 2, except that 4.4 g. of vinyl chloride and 7.2 g. of carbon dioxide were used, and reaction was conducted in water bath at 30° C. for 20 hours, using 0.2 ml. of a n-butane solution (concentration: 0.23 g./5 ml.) of diisopropyl peroxydicarbonate. As a result, 2.7 g. of powdery polymer partially containing small fragments were obtained. Infra-red absorption spectrum of the polymer revealed that the polymer is a single polymer of vinyl chloride.

What is claimed is:

1. In the method for preparing homopolymers or copolymers from vinyl monomers where at least one vinyl monomer is contacted with a catalytic composition in the absence of irradiation, the improvement comprising conducting polymerization in liquid carbon dioxide at a temperature of −78° to 100° C. under super atmospheric pressure.

2. A method according to claim 1 wherein, the vinyl compound is a member selected from the group consisting of vinyl chloride, styrene, methyl methacrylate, acrylonitrile, acrylic acid, vinyl acetate, ethylvinylether.

3. A method according to claim 1, wherein the catalyst is a radical initiator, a halide of Friedel-Crafts type catalyst, an organoaluminum compound or a coordination catalyst consisting of an organoaluminum compound and titanium chloride.

4. A method according to claim 3, wherein the radical initiator is a diaroyl peroxide, dialkyl peroxide, alkyl hydroperoxide, alkyl peroxycarbamate, azobisnitrile, azobis-substituted alkane, cyclic azobisnitrile or diazoaminobenzene.

5. A method according to claim 3, wherein the halide is titanium tetrachloride or a complex compound of boron fluoride etherate.

6. A method according to claim 3, wherein the organoaluminum compound is triethylaluminum.

FOREIGN PATENTS 835,121   5/1960   Great Britain.

MURRAY TILLMAN, Primary Examiner

R. B. TURER, Assistant Examiner

U.S. Cl. X.R.

204—159.22